(12) United States Patent
Miao

(10) Patent No.: US 8,601,464 B2
(45) Date of Patent: Dec. 3, 2013

(54) MEMORY ONLINE UPDATE SYSTEM AND METHOD

(75) Inventor: Proakis Miao, Beijing (CN)

(73) Assignee: Via Technologies, Inc., New Taipei (TW)

( * ) Notice: Subject to any disclaimer, the term of this patent is extended or adjusted under 35 U.S.C. 154(b) by 79 days.

(21) Appl. No.: 13/466,954

(22) Filed: May 8, 2012

(65) Prior Publication Data

US 2013/0067455 A1    Mar. 14, 2013

(30) Foreign Application Priority Data

Sep. 8, 2011   (CN) .......................... 2011 1 0267983

(51) Int. Cl.
*G06F 9/44*   (2006.01)
(52) U.S. Cl.
USPC ......................................................... 717/173
(58) Field of Classification Search
USPC ......................................................... 717/173
See application file for complete search history.

(56) References Cited

U.S. PATENT DOCUMENTS

| | | | |
|---|---|---|---|
| 2001/0034807 A1* | 10/2001 | Takaoka et al. | ............... 710/131 |
| 2002/0167932 A1 | 11/2002 | McGowan | |
| 2004/0243992 A1* | 12/2004 | Gustafson et al. | ............ 717/168 |
| 2012/0185682 A1* | 7/2012 | Klings et al. | ...................... 713/1 |
| 2012/0213005 A1* | 8/2012 | Lee | ........................... 365/185.11 |
| 2013/0031328 A1* | 1/2013 | Kelleher et al. | ............... 711/203 |

FOREIGN PATENT DOCUMENTS

| | | |
|---|---|---|
| CN | 1584822 | 2/2005 |
| CN | 1971516 | 5/2007 |

OTHER PUBLICATIONS

English language translation of abstract of CN 1584822 (published Feb. 23, 2005).
English language translation of abstract of CN 1971516 (published May 30, 2007).

* cited by examiner

*Primary Examiner* — Philip Wang
(74) *Attorney, Agent, or Firm* — McClure, Qualey & Rodack, LLP

(57) ABSTRACT

An online upgrade system/method for a memory. The system includes a host and an electronic device. An application is executed by the host and contains parameter records for different memory model types. The electronic device includes a memory and a device controller. The application distinguishes the model type of the memory equipped in the electronic device, and according to the model type of the memory, the application provides the device controller with the parameter record corresponding thereto and thereby the application upgrades the contents of the memory through the device controller.

20 Claims, 3 Drawing Sheets

MEMORY ONLINE UPDATE SYSTEM AND METHOD

CROSS REFERENCE TO RELATED APPLICATIONS

This Application claims priority of China Patent Application No. 201110267983.1, filed on Sep. 8, 2011, the entirety of which is incorporated by reference herein.

BACKGROUND OF THE INVENTION

1. Field of the Invention

The present invention relates to systems and methods for memory online updating, which may be used in online updating the firmware and data of a memory of an electronic device regardless of the memory model type of the memory.

2. Description of the Related Art

Electronic devices typically use memories to store firmware and data. For example, a flash memory or other types of non-volatile memories may be used as a memory in an electronic device. Note that different memory model types may require different operating parameters. The operating parameters include but not limited to the access method, the command format and so on. Thus, the firmware of an electronic device is usually designed to be compatible with the memory model type of the memory used in the electronic device. The firmware itself contains the parameter information about the memory in operation thus the firmware could properly access the memory. An online upgrade method has been introduced to update the contents of the memory, by which the electronic device is connected to a host and thereby the application on the host communicates with the firmware of the electronic device to upgrade the contents, including a firmware code or data, of the memory. By the conventional online upgrade method, there is no need to disassemble the memory from the electronic device to an external programmer to upgrade the contents.

However, the design flexibility of electronic devices is limited by the aforementioned conventional technique. For example, when the memory of the electronic device is implemented by another memory model type, the conventional online upgrade is not feasible. It is because that the firmware only supports the access to the memories of the original memory model type and doesn't support the online upgrading of a memory of another memory model type. The manufacturer has to disassemble the memory from the electronic device and use an external programmer to write a new firmware compatible with the new memory model type into the memory. The new firmware must contain the parameter information about the new memory model type. The increasing number of memory model types results in an increasing number of firmware versions. It is difficult for the manufacture to manage and maintain the various firmware versions.

BRIEF SUMMARY OF THE INVENTION

A system and a method for memory online upgrade regardless of the memory model type are disclosed.

A memory online upgrade system in accordance with an exemplary embodiment of the invention comprises a host and an electronic device. The host executes an application. The application is loaded with multiple parameter records corresponding to different memory model types. The electronic device comprises a memory and a device controller. The application first recognizes the memory model type of the memory through the device controller, and then transfers one parameter record, obtained from the multiple parameter records and corresponding to the recognized memory model type, to the device controller as a reference which is to be referred to when the application online updates contents of the memory through the device controller.

A memory online upgrade method in accordance with an exemplary embodiment of the invention comprises the steps as below: loading a plurality of parameter records corresponding to different memory model types to an application executed by a host; recognizing the memory model type of a memory of an electronic device; using the application to transfer one parameter record corresponding to the recognized memory model type and obtained from the plurality of parameter records to a device controller of the electronic device; and online upgrading contents of the memory through the device controller based on the parameter record corresponding to the recognized memory model type.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
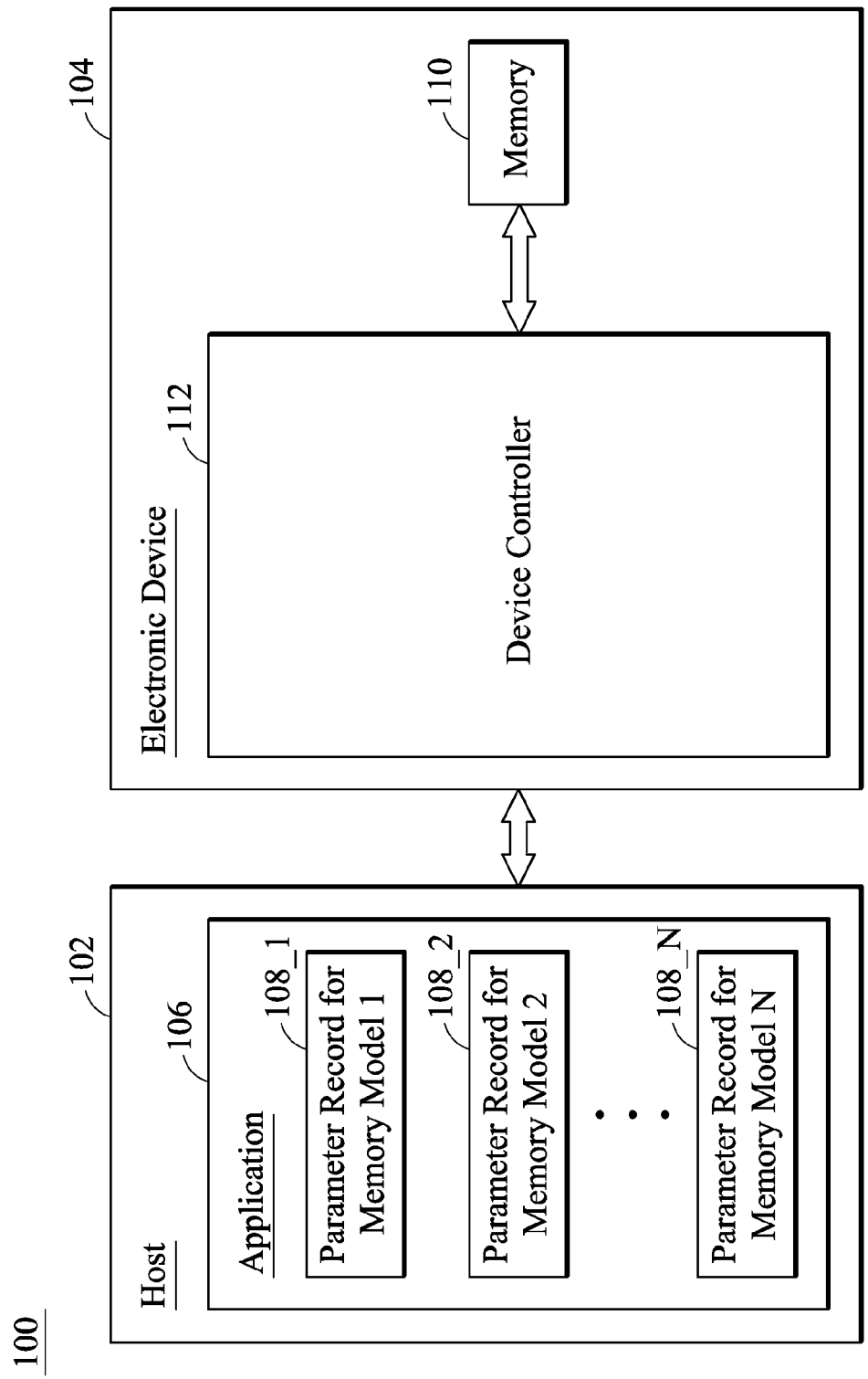
FIG. 1 illustrates a memory online upgrade system 100 in accordance with an exemplary embodiment of the invention.

FIG. 1 illustrates a memory online upgrade system 100 in accordance with an exemplary embodiment of the invention, which comprises a host 102 and an electronic device 104. The host 102 executes an application 106. The application 106 is loaded with a plurality of parameter records 108_1-108_N corresponding to different memory model types. The electronic device 104 comprises a memory 110 and a device controller 112. The memory 110, for example, may be a flash memory, or any other type of rewritable non-volatile memory. The application 106 recognizes the memory model type of the memory 110 through the device controller 112, and transfers one parameter record obtained from the plurality of parameter records 108_1-108_N and corresponding to the memory model type of the memory 110 to the device controller 112 as a reference which is to be referred to when the application 106 online updates the contents of the memory 110 through the device controller 112. The contents of the memory 110 comprise a firmware code of the device controller 112 and other data.

In a case wherein the memory 110 is a flash memory, a parameter record (108_1, . . . , or 108_N) may be presented in a data structure FLH_PARA as shown below:

dwChipSize, describing the total number of bytes of the flash memory;

wSectorSize, describing the number of bytes of each erasable unit, as known as a sector size in bytes;
wPageSize, describing a page size in bytes;
FLH_ID, a data structure, comprising:
  bManuID, describing the manufacture ID;
  bDevID, describing the device ID; and
  bReserved, a reserved word;
nByteAddr, describing the number of address bytes of a read command or a sector erase command;
nRdIdDummyByte, describing how many dummy bytes follow a read ID command before an identification code is transferred back from the flash memory;
FLH_CMD, a data structure, describing the commands utilized by the firmware of the device controller 112, comprising:
  rdid, a read ID command;
  read, a command for reading contents of the memory;
  sectErs, a sector erase command;
  pp, a page program command;
  rdsr, a command for reading a status register;
  wren, a write enable command;
  wrdi, a write disable command;
  chipErs, a chip erase command;
  AAIProg, an AAI program command;
  ewsr, a command for enabling the write of a status register;
  wrsr, a command for writing a status register;
  wherein the commands not supported by the memory may be filled with value 0, except the fields pgProg and AAIProg. Neither pgProg nor AAIProg is allowed to be filled with 0b at every bit or 1b at every bit.
FLH_STAT_MASK, a data structure, describing the mask of a status register, comprising:
  busy, a busy/ready flag of the status register;
  wel, a write enable latch flag of the status register; and
  bp, a block protect flag of the status register.
wherein the manufacture ID and the device ID recorded in the data structure FLH_ID may be regarded as an identification label of the parameter record corresponding thereto. By checking the identification label, the application 106 may determine which one of the parameter records 108_1 to 108_N corresponds to the memory model type of the memory 110. The aforementioned fields are just examples and not intended to limit the contents of a parameter record. Users may change the fields according to the practical demands.

Figure 2:
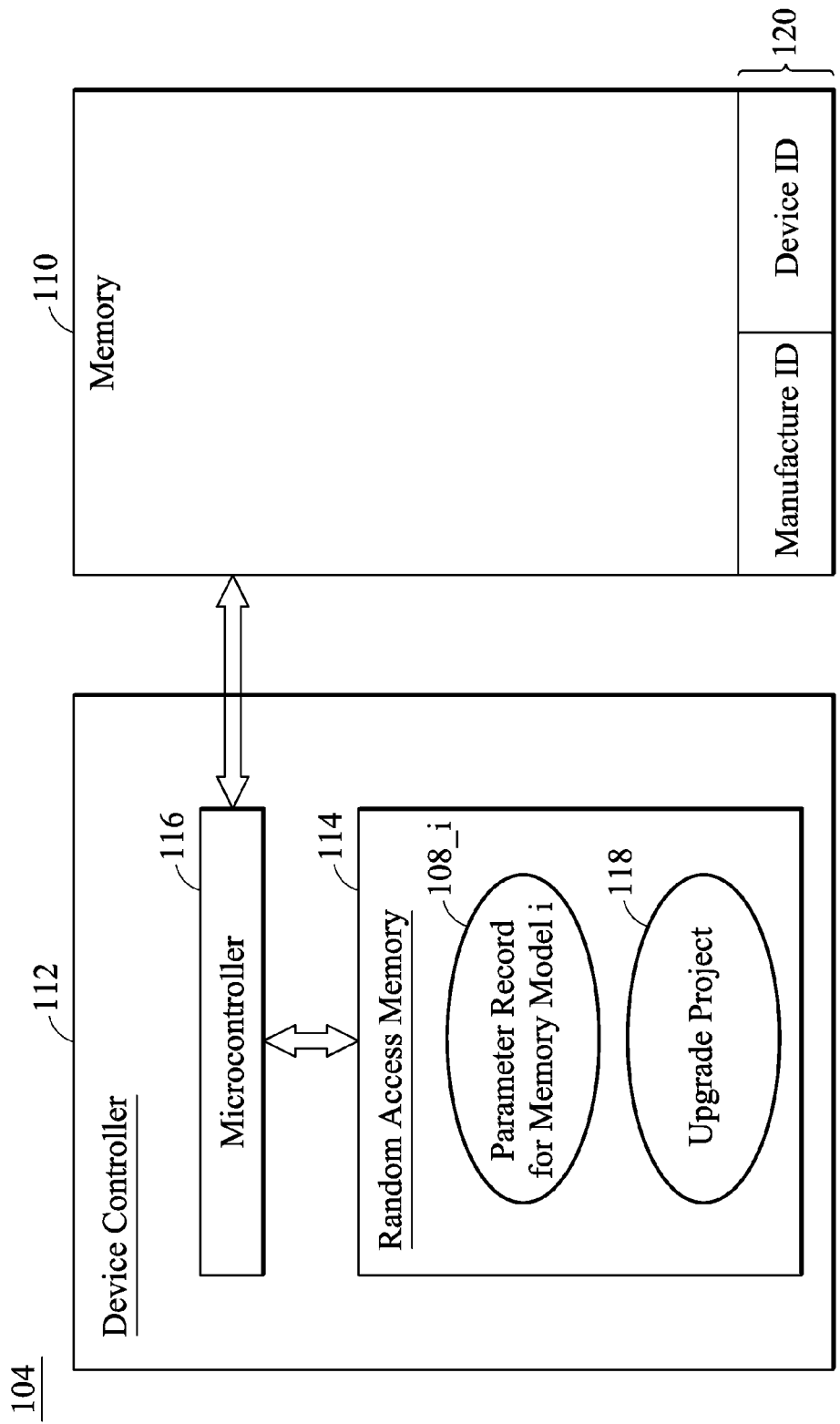
FIG. 2 shows an electronic device 104 in detail in accordance with an exemplary embodiment of the invention.

The communication between the host 102 and the electronic device 104 may be realized by using the application 106 to communicate with an upgrade project operated in the device controller 112. According to an exemplary embodiment of the invention, FIG. 2 shows the electronic device 104 in detail. The electronic device 104 comprises a device controller 112 and a memory 110. The device controller 112 further comprises a random access memory (RAM) 114 and a microcontroller (for example, a Micro Control Unit, MCU) 116. The random access memory 114 stores a parameter record 108_i corresponding to the memory model type of the memory 110 and an upgrade project 118. The microcontroller 116 controls the random access memory 114 and the memory 110 for executing of the upgrade project 118. The memory 110 contains model information 120. In an exemplary embodiment of the invention, the memory 110 may be a flash memory and the model information 120 may be the manufacture ID and/or the device ID of the flash memory. These identification codes are solidly stored in the memory 110 when manufactured, in a place protected from the user. The application 106 recognizes the memory model type of the memory 110 via the upgrade project 118. For example, the model information 120 is read and compared with the manufacture ID and the device ID of the data structure of each of the parameter records 108_1-108_N. Thus, a parameter record 108_i corresponding to the model information 120 is obtained from the parameter records 108_1-108_N and transferred to the random access memory 114 of the device controller 112. According to the parameter record 108_i, the application 106 may upgrade the contents of the memory 110 through the device controller 110. The upgrade operations include a first download function, a second download function and a data upload function and so on, as detailed below.

In an exemplary embodiment of the invention, the connection interface between the host 102 and the electronic device 104 may be a USB interface, and the upgrade project 118 may be a device firmware upgrade project (DFU project). Set Reports and Get Reports for a Human Interface Device (HID, defined by Microsoft) may work as the communication protocol between the application 106 and upgrade project 118. In this manner, the application 106 controls the electronic device 106 through the upgrade project 118 provided by the device controller 112. In another exemplary embodiment, the application 106 and the upgrade project 118 may communicate by other communication protocols.

In an exemplary embodiment, the upgrade project 118 is a complete executable project and may be stored in the host 102 in advance and then downloaded to the random access memory 114 to be executed by the microcontroller 116. In another exemplary embodiment, the upgrade project 118 may be stored in the memory 110 in advance and then copied to the random access memory 114 to be executed by the microcontroller 116.

Based on the communication protocol built by Set Reports and Get Reports for an HID between the application 106 and the upgrade project 118, the application 106 may develop a memory model type recognition function, a memory parameter supply function, a first download function, a second download function and a data upload function, and so on. Based on the developed functions, the host 102 can online upgrade the memory 110 through the upgrade project 118 executed by the device controller 112, regardless of the memory model type. The functions developed for the application 106 are discussed in the following paragraphs.

In this paragraph, the memory model type recognition function is discussed, by which the application 106 is capable of recognizing the memory model type of the memory 110. To implement this function, the HID Set Report that the application 106 sends to the upgrade project 118 (i.e. received by the device controller 112) is a memory access Set Report, which comprises:
  bCmd, set to a value HID_CMD_FLH_ACCESS, representing that the Set Report is for recognizing the memory model type of the memory 110;
  bWrByte, the number of bytes that is going to be written into the memory 110;
  bRdByte, the number of bytes that is going to be read from the memory 110; and
  baWrDat, an array of bytes, containing data to be written into the memory 110.

To get the recognition result, the application 106 further generates an HID Get Report to the upgrade project 118 and the recognition result is returned from the upgrade project 118 accordingly. The recognition result returned to the application 106 may be the model information 120 read out from the memory 110. The Get Report may contain:
  bandDat, an array of bytes, containing all the data read from the memory 110;

bRdByte, the number of bytes of the data contained in the array bandDat.

In this paragraph, the memory parameter supply function is discussed, by which the application 106 provides the device controller 112 with the parameter record 108_i corresponding to the memory model type of the memory 110. To implement this function, the HID Set Report that the application 106 sends to the upgrade project 118 is a Set Report for setting memory parameters (HID_CMD_SET_FLH_PARA), which comprises:

bCmd, set to a constant value HID_CMD_SET_FLH_PARA, representing that the Set Report is for providing the parameter record corresponding to the memory model type of the memory 110 to the electronic device 104; and flhPara, as the same data structure as FLH_PARA, provided by the application 106 and containing the parameter record 108_i corresponding to the recognition result.

The parameter record flhPara provided by the application 106 may be verified by the microcontroller 116 (for example, checking whether the memory model type of the memory 110 matches the parameter record, or examining whether the memory 110 is correctly operated according to the parameter record.) To obtain the verification result, the application 106 may output another HID Get Repost to the upgrade project 118. The Get Report may request an error code flhErr. The error code flhErr may be:

FLH_NO_ERR, representing that the memory 110 operates normally in accordance with the parameter record flhPara;

FLH_ERR_UNRECOGNIZE_FLASH, indicating an unrecognizable error;

FLH_ERR_ADDR_OUT_OF_RANGE, representing that the data received by microcontroller 116 during the verification procedure exceeds the expected length;

FLH_ERR_WREN_FAIL, representing that the write enable command has failed;

FLH_ERR_WRDI_FAIL, representing that the write disable command has failed;

FLH_ERR_UNPROT_FAIL, representing that the unlocking of protection of a block has failed;

FLH_ERR_ERASE_FAIL, representing that the block erasing has failed; and

FLG_ERR_VERIFY_FAIL, representing that the data that the microcontroller 116 read back from the memory 110 during the verification is different from the data previously written by the Set Report.

The aforementioned messages are just examples and not intended to limit the type of the error code. Users may change the messages according to the practical demands.

When the application 106 has sent the Set Report for setting memory parameters and transferred the parameter record 108_i to the device controller 112 and the verification has been passed, it is ready to download or upload data to upgrade the memory 110. The communication protocol discussed below shows how the application 106 and upgrade project 118 upgrade the memory 110. The application 106 provides a first download function and a second download function, both operated by the application 106 to download data from the host 102 to the memory 110 through the device controller 112. The difference between the first and second download functions is that when the download occurs at a sector erase boundary the first download function performs a sector erase operation but the second download ignores the sector erase boundary. For example, to upgrade the memory 110 by multiple stages, the first upgrade stage is generally realized by the first download function for sector erasing, and the second download function is used in the next stages to preserve the data upgraded in the first stage. In other examples, the first download function is used when the memory 110 is changed to another memory model type and it is required to download the firmware code to the memory 110 of the new memory model type, or, when a new version of firmware code has to be downloaded to the memory 110 to upgrade the firmware. In another example, the second download function is performed when upgrading only a small amount of user data in the memory 110.

In the first download function, an HID Set Report that the application 106 sends to the upgrade project 118 is a first download Set Report (HID_CMD_DOWNLOAD), which comprises:

bCmd, set to a constant value HID_CMD_DOWNLOAD, representing that the Set Report is for the first download function;

dwAddr, indicating the download start address at the memory 110;

deLength, the length of the data to be downloaded;

bVerify, showing whether a verification is required after the data download;

Following the first download Set Report, the raw data of the data to be downloaded to the memory 110 are sent to the upgrade project 118 in batches by several third download Set Reports, accompanying with HID Get Reports with verification results. The third download Set Report may include:

baData, an array of bytes, including the raw data to be upgraded to the memory 110; and nByte, the number of valid bits of the array baData.

The Get Report may ask for the error code flhErr as defined above. Once the returned error code is not FLH_NO_ERR, the application 106 stops the microcontroller 116 from downloading data to the memory 110 and may enter the idle state to wait for the follow-up user instructions.

In the second download function, the HID Set Report that the application 106 sends to the upgrade project 118 is a second download Set Report. The second download Set Report and the HID Get Report corresponding thereto are similar to the first Set Report and the HID Get Report for the first download function. The difference is that a field bCmd in the second download Set Report is set to a constant value HID_CMD_PROGRAM, representing that the Set Report is for the second download function, and the sector erase boundary has to be ignored and no sector erase operation is performed.

The data upload function is discussed in this paragraph, for data upload from the memory 110. For the data uploading, the HID Set Report that the application 106 sends to the upgrade project 118 is a data upload Set Report HID_CMD_UPLAOD, which may comprise:

bCmd, set to a constant value HID_CMD_UPLOAD, representing that the Set Report is for data upload from the memory 110;

dwAddr, indicating the upload start address at the memory 110; and dwLength, the length of data to be uploaded.

To obtain the upload data from the memory 110, the application 106 may send an HID Get Report to the upgraded project 118. For example, the application 106 may output a series of Get Reports to the upgrade project 118 to collect raw data of the data uploaded from the memory 110, till the data length dwLength is reached or an error occurs.

Figure 3:
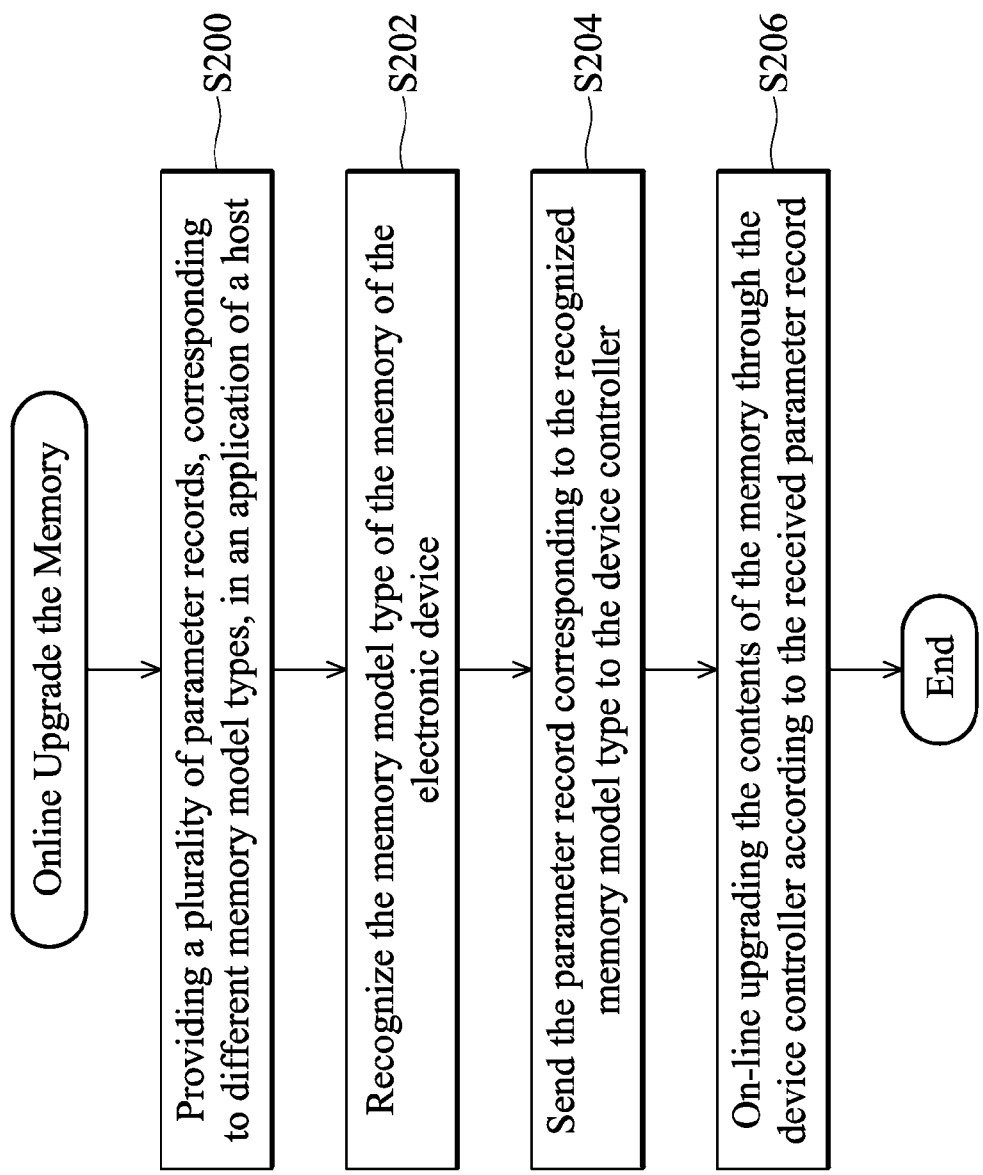
FIG. 3 is a flowchart depicting how the application 106 online upgrades the memory 110 through the device controller 112.

FIG. 3 is a flowchart depicting how the application 106 online upgrades the memory 110 through the device controller 112. In step S200, a plurality of parameter records corresponding to different memory model types are provided in an application of a host. For example, referring to FIG. 1, the application 106 executed by the host 102 contains a plurality of parameter records 108_1-108_N. In step S202, the memory model type of the memory 110 of the electronic device 106 is recognized. The application 106 sends a memory access command to the device controller 112 to recognize the memory model type of the memory 110. In the embodiment that utilizes the HID Set Reports and Get Reports as the communication protocol, the memory access command may be implemented by the aforementioned "memory access Set Report", and, the device controller 112 returns model information 120 to the application 106. In step S204, the application 106 sends the parameter record corresponding to the memory model type of the memory 110 to the device controller 112 as a reference which is to be referred to when the application 106 upgrades contents of the memory 110 through the device controller 112. Specifically, the application 106 provides the device controller 112 with a memory parameter set command according to the model information 120, by which the parameter record 108_i corresponding to the memory model type of the memory 110 is sent to the device controller 112. Verification is performed by the device controller 112 to check whether the parameter record 108_i is suitable. In the embodiment that utilizes the HID Set Reports and Get Reports as the communication protocol, the memory parameter set command may be implemented as the "Set Report for setting memory parameters", as discussed above. In step S206, the application 106 executes the first download, the second download and data upload functions, to upgrade the contents of the memory 110 through the device controller 112. The upgrading that the device controller 112 performs on the memory 110 (firmware upgrading or data upgrading) is based on the parameter record that the device controller 112 receives in the step S204. By the aforementioned techniques, the host 102 executes the application 106 to online upgrade the memory 110, and it is not required to disassemble the memory 110 from the electronic device 104 and connect it to an external programmer for a burn-in procedure.

According to the memory online upgrade systems and methods disclosed in the invention, the memory online upgrading is allowed for electronic devices of identical connection ports regardless whichever the memory model type thereof is. To support the online upgrading of a new memory model type, a new parameter record is added into the application. Adding a new parameter record is easier than amending the firmware of the electronic device and there is no need to maintain several versions of firmware for different memory model types. When another memory model type is used, the contents of the memory are online upgraded without amending the firmware of the electronic device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory online upgrade system, comprising:
a host, executing an application, wherein the application is loaded with a plurality of parameter records corresponding to a plurality of memory model types; and
an electronic device, comprising a memory and a device controller,
wherein the application recognizes the memory model type of the memory through the device controller, and transfers the parameter record corresponding to the recognized memory model type and obtained from the plurality of parameter records to the device controller as a reference which is to be referred to when the application online upgrades contents of the memory through the device controller.

2. The memory online upgrade system as claimed in claim 1, wherein the device controller executes an upgrade project, and through the upgrade project, the application recognizes the memory model type of the memory and transfers the parameter record corresponding to the recognized memory model type to the device controller.

3. The memory online upgrade system as claimed in claim 2, wherein the upgrade project is a complete executable project and is stored in the host and then downloaded to the device controller to be executed.

4. The memory online upgrade system as claimed in claim 2, wherein the device controller comprises:
a random access memory, temporarily stored with the upgrade project and the parameter record corresponding to the recognized memory model type; and
a microcontroller, executing the upgrade project.

5. The memory online upgrade system as claimed in claim 1, wherein a communication protocol between the application and the device controller is built by Get Reports and Set Reports for a Human Interface Device.

6. The memory online upgrade system as claimed in claim 1, wherein the application sends a memory access command to the device controller to recognize the memory model type of the memory, and, the device controller returns model information to the application.

7. The memory online upgrade system as claimed in claim 6, wherein the model information includes a manufacture ID and/or a device ID of the memory.

8. The memory online upgrade system as claimed in claim 6, wherein the application sends a memory parameter set command to the device controller based on the model information to transfer the parameter record corresponding to the recognized memory model type to the device controller, and, the device controller verifies whether the transferred parameter record matches the memory.

9. The memory online upgrade system as claimed in claim 8, wherein the memory access command and the memory parameter set command are Set Reports for a Human Interface Device.

10. The memory online upgrade system as claimed in claim 1, wherein the application further provides:
a first download function, downloading data to the memory through the device controller, wherein a sector erase operation is performed when the download occurs at a sector erase boundary;
a second download function, downloading data to the memory through the device controller, wherein sector erase boundaries are ignored during the downloading; and
a data upload function, uploading data from the memory through the device controller.

11. A memory online upgrade method, comprising:
loading a plurality of parameter records corresponding to a plurality of memory model types into an application executed by a host;
recognizing the memory model type of a memory of an electronic device;

transferring one parameter record corresponding to the recognized memory model type and obtained from the plurality of parameter records to a device controller of the electronic device; and online upgrading contents of the memory through the device controller based on the parameter record corresponding to the recognized memory model type.

12. The memory online upgrade method as claimed in claim 11, further comprising:

adding a new parameter record into the application to support online upgrading of a memory of a new memory model type.

13. The memory online upgrade method as claimed in claim 11, wherein the step of recognizing, the step of transferring and the step of online upgrading are executed through communication between the application and a upgrade project executed by the device controller.

14. The memory online upgrade method as claimed in claim 13, wherein upgrade project is a complete executable project and is stored in the host and then downloaded to the device controller to be executed.

15. The memory online upgrade method as claimed in claim 13, wherein a communication protocol between the application and the upgrade project is built by Get Reports and Set Reports for a Human Interface Device.

16. The memory online upgrade method as claimed in claim 11, wherein the application sends a memory access command to the device controller to recognize the memory model type of the memory, and, the device controller returns model information to the application.

17. The memory online upgrade method as claimed in claim 16, wherein the model information includes a manufacture ID and/or a device ID of the memory.

18. The memory online upgrade method as claimed in claim 16, wherein the application sends a memory parameter set command to the device controller based on the model information to transfer the parameter record corresponding to the recognized memory model type to the device controller, and, the device controller verifies whether the transferred parameter record matches the memory.

19. The memory online upgrade method as claimed in claim 18, wherein the memory access command and the memory parameter set command are Set Reports for a Human Interface Device.

20. The memory online upgrade method as claimed in claim 11, further comprising:

downloading data to the memory through the device controller; and uploading data from the memory through the device controller.

* * * * *